United States Patent [19]

Cheung

[11] Patent Number: 5,896,431
[45] Date of Patent: Apr. 20, 1999

[54] SYSTEMS AND METHODS FOR PREVENTING STEAM LEAKAGE BETWEEN A DRYWELL AND A WETWELL IN A NUCLEAR REACTOR

[75] Inventor: Yee Kwong Cheung, San Jose, Calif.

[73] Assignee: General Electric Company, Schenectady, N.Y.

[21] Appl. No.: 08/896,778

[22] Filed: Jul. 18, 1997

[51] Int. Cl.$^6$ .................................................. G21C 15/18
[52] U.S. Cl. .................. 376/283; 376/299; 376/298; 376/282
[58] Field of Search ..................... 376/282, 283, 376/298, 299

[56] References Cited

U.S. PATENT DOCUMENTS

| | | | |
|---|---|---|---|
| 5,149,492 | 9/1992 | Arai et al. | 376/283 |
| 5,276,720 | 1/1994 | Oosterkamp et al. | 376/283 |
| 5,303,274 | 4/1994 | Sawyer | 376/283 |

FOREIGN PATENT DOCUMENTS 7-325188  12/1995  Japan.

OTHER PUBLICATIONS

Otsu, Cooling System for Reactor Isolation Time, Patent Abstracts of Japan, JP-07-325188, Dec. 1995.

*Primary Examiner*—Charles T. Jordan
*Assistant Examiner*—M. J. Lattig
*Attorney, Agent, or Firm*—Armstrong Teasdale LLP

[57] ABSTRACT

Systems, methods, and apparatus for preventing steam leakage between a drywell and a wetwell in a nuclear reactor are described. In accordance with one embodiment of the present invention, the vacuum breaker of the nuclear reactor is coupled to a vacuum breaker condensing system which includes a condenser and a steam inlet pipe. The steam inlet pipe is substantially hollow and includes a first end, a second end, and a loop seal between the first and second ends. The first end of the pipe is positioned adjacent the drywell and the second end of the pipe is coupled to the vacuum breaker. The condenser is positioned proximate the steam inlet pipe and includes an inlet, an outlet, and a plurality of condenser tubes. The condenser inlet and condenser outlet are each coupled to a pool of water, e.g., the Gravity Driven Cooling System pool, and configured to draw water from the pool of water and through the condenser tubes to substantially condense steam flowing through the steam inlet pipe.

16 Claims, 2 Drawing Sheets

10

SYSTEMS AND METHODS FOR PREVENTING STEAM LEAKAGE BETWEEN A DRYWELL AND A WETWELL IN A NUCLEAR REACTOR

FIELD OF THE INVENTION

This invention relates generally to nuclear reactors and, more particularly, to passive containment cooling systems for such reactors.

BACKGROUND OF THE INVENTION

One known boiling water nuclear reactor includes a drywell, or containment, a wetwell, a Gravity Driven Cooling System (GDCS) and a passive cooling containment system (PCCS). The drywell is designed to withstand pressure generated by a reactor pressure vessel (RPV) during reactor operation, and the PCCS is configured to limit the pressure within the containment to a pressure below a design pressure of the containment and to keep the RPV core substantially cool.

The GDCS is substantially isolated from the drywell and is an emergency source of low pressure reactor coolant used following a loss of coolant event in at least one known boiling water reactor (BWR). A typical GDCS includes pools of coolant positioned so that when coolant from the pools must be supplied to the RPV, the coolant flows, under gravity forces, through the GDCS coolant delivery system into the RPV. Under normal reactor operating conditions, however, coolant from the GDCS does not flow into the RPV.

A typical PCCS includes several condensers positioned in a PCCS pool of water. Each condenser includes an upper drum, a lower drum, and several heat exchanger tubes extending between the upper and lower drums. The upper drums are coupled to the drywell via a steam inlet passage, and steam generated within the containment flows from the upper drums and to the lower drums through the exchanger tubes. The steam is condensed into water and noncondensable gases, e.g., noncondensables, flow between the upper and lower drums. The condensed steam is drained from the lower drums and to the condensate drain tank via a condensate drain line.

The noncondensables are drained from the lower drums utilizing vent lines which extend from each lower drum and into the wetwell suppression pool. Noncondensables are discharged from the lower drums and into the suppression pool, and rise through the suppression pool to the wetwell air space.

The wetwell is separated from the containment by a wall having an opening therein. A vacuum breaker typically seals the opening and is movable between an open position and a closed position. The vacuum breaker is a check valve which allows the noncondensables and steam to pass from the wetwell to the drywell and substantially prevent a large differential pressure from developing between the wetwell and the drywell. Particularly, if pressure in the wetwell becomes sufficiently great compared to pressure in the drywell, the vacuum breaker opens and noncondensables and steam in the wetwell flow through the vacuum breaker and into the drywell to reduce the differential pressure.

If the vacuum breaker becomes stuck in the open position, it is possible for the differential pressure between the wetwell and the drywell to reduce too much. Particularly, it is possible for steam in the drywell to bypass the PCCS steam inlet passage and flow directly into the wetwell via the vacuum breaker, which is undesirable.

To prevent a vacuum breaker from sticking in the open position, it is known to utilize an isolation valve. However, isolation valves sometimes fail and thus cause the vacuum breaker to cease operating. In addition, isolation valves must often be monitored to ensure proper operation.

It would be desirable to provide a system which substantially prevents steam and noncondensables from flowing from the drywell and into the wetwell while the vacuum breaker is in the open position. It further would be desirable for such system to facilitate the maintenance of an acceptable drywell to wetwell pressure differential.

SUMMARY OF THE INVENTION

These and other objects may be attained by a vacuum breaker condensing system which, in one embodiment, includes a condenser and a steam inlet pipe. The steam inlet pipe is substantially hollow and includes a first end, a second end, and a loop seal between the first and second ends. The first end of the pipe is positioned adjacent the drywell and the second end of the pipe is coupled to the vacuum breaker.

The condenser is positioned proximate the steam inlet pipe and is configured to substantially condense steam flowing through the steam inlet pipe. The condenser includes an inlet, an outlet, and a plurality of condenser tubes. The condenser inlet and condenser outlet are each coupled to a pool of water, e.g., the Gravity Driven Cooling System pool, and configured to draw water from the pool of water and through the condenser tubes.

In operation, and when the vacuum valve is stuck in the open position, steam and noncondensables flow from the drywell through the steam inlet pipe toward the vacuum breaker. The condenser substantially condenses the steam, and the condensate collects in the loop seal. The collected condensate substantially seals the steam inlet pipe and substantially prevents additional steam and noncondensables from flowing from the drywell toward the vacuum breaker.

The above described system substantially prevents steam and noncondensables from flowing from the drywell and into the wetwell while the vacuum breaker is in the open position. Such system also facilitates maintaining an acceptable drywell to wetwell pressure differential.

DETAILED DESCRIPTION

Figure 1:
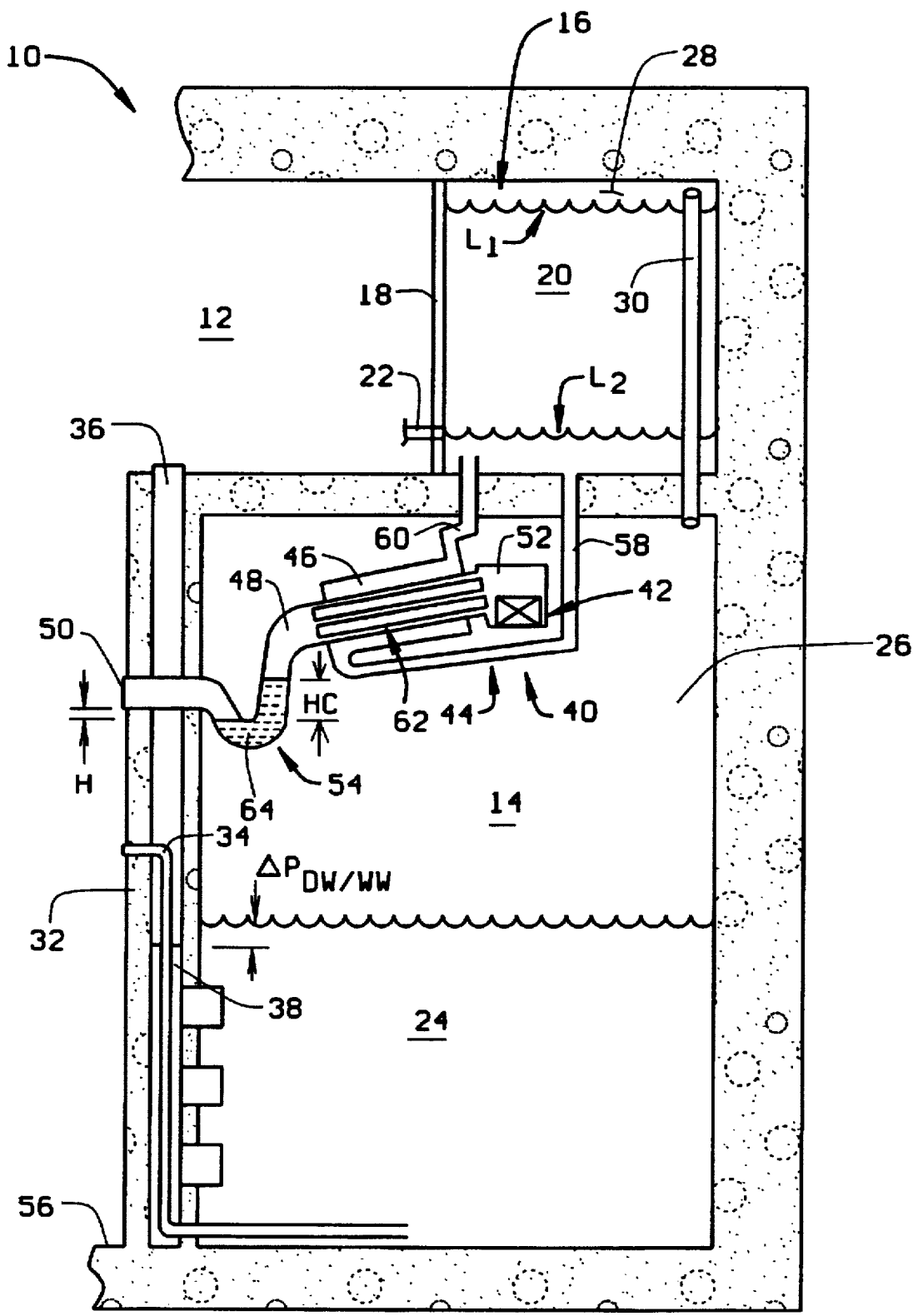
FIG. 1 is a schematic illustration of a section of a boiling water reactor in accordance with one embodiment of the present invention.

FIG. 1 is a schematic illustration of a section of a boiling water reactor 10 in accordance with one embodiment of the present invention. Boiling water reactor 10 includes a drywell 12, a wetwell 14, and a Gravity Driven Cooling System (GDCS) 16. GDCS 16 is substantially separated from drywell 12 by a GDCS wall 18, and includes a pool of coolant 20, e.g., water, positioned so that when coolant from pool 20 must be supplied to a reactor pressure vessel (not shown in FIG. 1), the coolant flows, under gravity forces, through a GDCS coolant injection line 22 into the reactor pressure vessel. Under normal reactor operating conditions, however, coolant from GDCS 16 does not flow into the RPV. Pool of coolant 20 is movable between an initial level $L_1$ and a minimum level $L_2$, which corresponds to the elevation of GDCS injection line 22.

Wetwell 14 includes a suppression pool of water 24 and is substantially separated from both drywell 12 and GDCS pool 20. An air space 26 above suppression pool 24 is connected to an air space 28 above GDCS pool 20 via a vent pipe 30. A wall 32 extends between wetwell 14 and drywell 12, and an opening, or spill-over-hole, extends therethrough. A spill-over line 34 extends from suppression pool 24 through the spill-over-hole. Wetwell 14 further includes a main vent 36 filled at least partially with water 38, and suppression pool of water 24 is higher than the main vent water 38 by a pressure differential $\Delta P_{DW/WW}$, which represents the pressure differential between drywell 12 and wetwell 14. Drywells, wetwells, GDCSes, spill-over-holes, and vent lines are well known.

A vacuum breaker assembly 40 including a vacuum breaker 42 and a vacuum breaker condensing system 44 couples wetwell 14 and drywell 12. Vacuum breaker 42 may, for example, be a known vacuum breaker, and is configured to move between an open position, where fluid and steam flow through vacuum breaker 42 between wetwell 14 and drywell 12, and a closed position, where vacuum breaker 42 substantially prevents fluid and steam from flowing between wetwell 14 and drywell 12. Condensing system 44 is coupled to vacuum breaker 42 and includes a condenser 46 and a steam inlet pipe 48. Steam inlet pipe 48 is substantially hollow and includes a first end 50 and a second end 52. First end 50 of steam inlet pipe 48 extends through wall 32 and second end 52 of steam inlet pipe 48 is coupled to vacuum breaker 42. Between first and second ends 50 and 52, respectively, steam inlet pipe 48 further includes a loop seal 54 having a height H. Steam inlet pipe first end 50 is spaced above the spill-over-hole with respect to a floor 56 of drywell 12 so that first end 50 will always be above a drywell pool of water (not shown) which may accumulate during reactor operation.

Condenser 46 is positioned in wetwell 14 proximate steam inlet pipe 48 and is configured to substantially condense steam flowing through steam inlet pipe 48. Condenser 46 includes an inlet, or cold leg, 58, an outlet, or hot leg, 60, and a plurality of condenser tubes 62. Condenser inlet 58 and condenser outlet 60 each extend between GDCS pool 20 and wetwell 14, and are configured to draw water from GDCS pool 20 and through condenser tubes 62.

During reactor operation, vacuum breaker 42 typically moves to the open position to reduce the pressure differential between wetwell 14 and drywell 12. Particularly, if pressure in wetwell 14 becomes sufficiently great compared to pressure in drywell 12, vacuum breaker 42 opens and noncondensables and steam in wetwell 14 flow through vacuum breaker 42 and into drywell 12 to reduce the differential pressure.

Vacuum breaker condensing system 44 substantially prevents steam from flowing from drywell 12 and into wetwell 14 while vacuum breaker 42 is in the open position. If vacuum breaker 42 becomes stuck in the open position for too long, it is possible for the differential pressure between the wetwell 14 and the drywell 12 to reduce so that steam in drywell 12 begins flowing from drywell 12 and through steam inlet pipe 48 toward vacuum breaker 42 and wetwell 14. Condenser inlet 58 supplies cold water from GDCS pool 20 to condenser 46, which circulates such water through condenser tubes 62 to substantially condense any steam flowing through pipe 48. The heated water flowing through condenser tubes 62 is discharged from condensing system 44 via condenser outlet 60 and into GDCS pool 20.

Condensed steam, or condensate, 64 accumulates in loop seal 54 and forms a static head column HC of approximately $\Delta P_{DW/WW}$. Static head column HC substantially seals steam inlet pipe 48 and substantially prevents additional steam and noncondensables from flowing from drywell 12 toward vacuum breaker 42 through steam inlet pipe 48.

Condensing system 44 also facilitates maintaining an acceptable drywell 12 to wetwell 14 pressure differential. Particularly, if pressure in wetwell 14 becomes greater than the sum of the pressure in drywell 12 and pressure generated by static head column HC, then such wetwell pressure will discharge condensate 64 from steam inlet pipe first end 50. Accordingly, steam and fluid may flow through open vacuum breaker 42 from wetwell 14 to drywell 12 to reduce the pressure differential between wetwell 14 and drywell 12. If the pressure differential between wetwell 14 and drywell 12 again becomes too small, condensing system 44 condenses steam in pipe 48 to again substantially seal pipe 48 and substantially prevent steam and fluid from flowing directly from drywell 12 to wetwell 14.

GDCS pool of water 20 may, for example, have a temperature of approximately 47 degrees Celsius. Steam flowing from drywell 12 toward vacuum breaker 42 through steam inlet pipe 48 may, for example, have a temperature of approximately 132.5 degrees Celsius. Accordingly, an initial temperature difference across condenser 46 may approximate 85.5 degrees Celsius.

The above described condensing system 44 substantially prevents steam and noncondensables from flowing from drywell 12 and into wetwell 14 while vacuum breaker 42 is in the open position. Such system 44 also facilitates maintaining an acceptable drywell to wetwell pressure differential.

Figure 2:
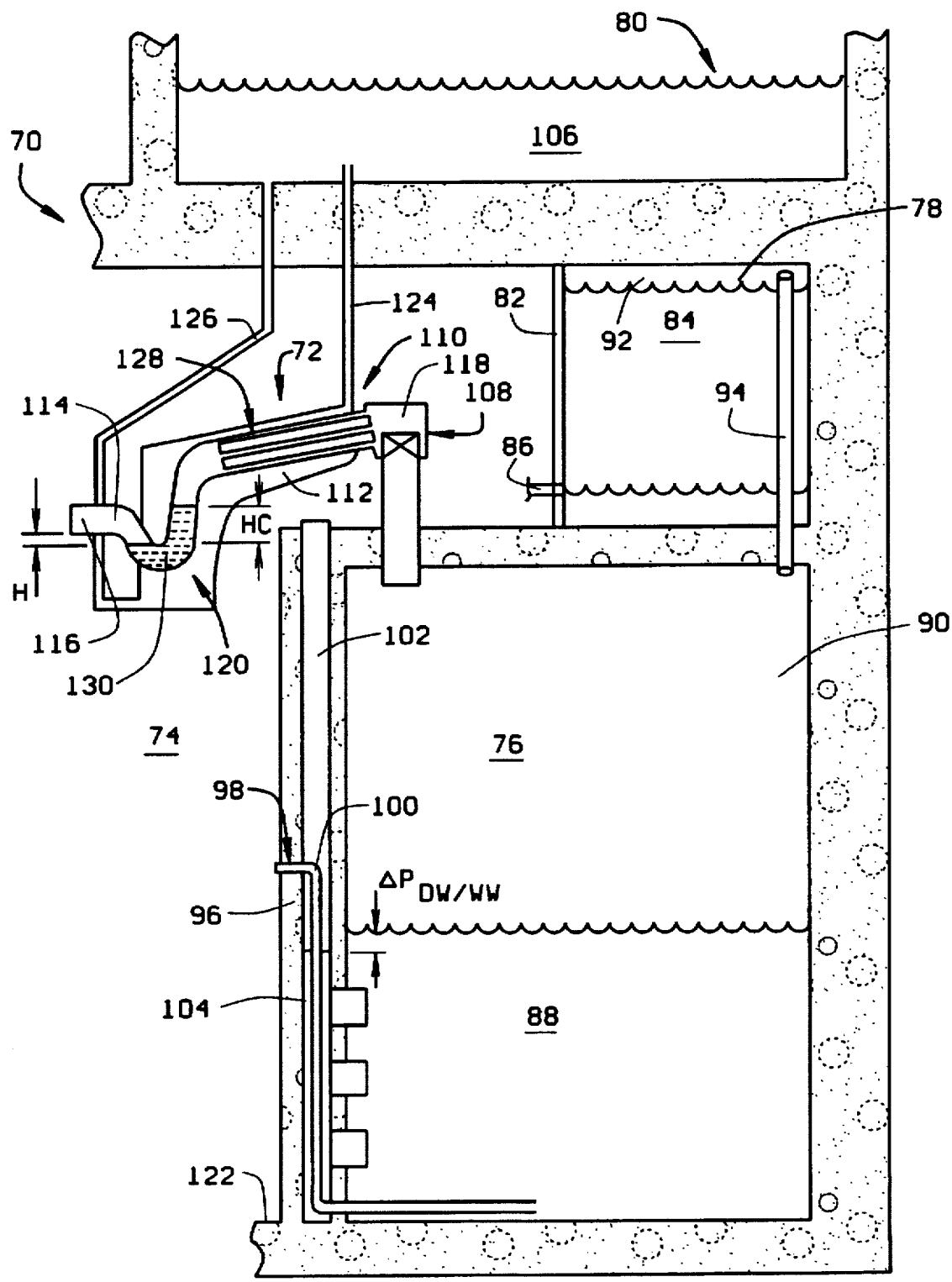
FIG. 2 is a schematic illustration of a section of a boiling water reactor in accordance with another embodiment of the present invention.

FIG. 2 is a schematic illustration of a section of a boiling water reactor 70 including a vacuum breaker assembly 72 in accordance with another embodiment of the present invention. Reactor 70 includes a drywell 74, a wetwell 76, a Gravity Driven Cooling System (GDCS) 78 and a passive cooling containment system (PCCS) 80. GDCS 78 is substantially separated from drywell 74 by a GDCS wall 82, and includes a pool of coolant 84 positioned so that when coolant from pool 84 must be supplied to a reactor pressure vessel (not shown in FIG. 2), the coolant flows, under gravity forces, through a GDCS coolant injection line 86 into the reactor pressure vessel. Under normal reactor operating conditions, however, coolant from GDCS 78 does not flow into the reactor pressure vessel.

Wetwell 76 includes a suppression pool of water 88 and is substantially separated from both drywell 74 and GDCS pool 84. An air space 90 above suppression pool 88 is connected to an air space 92 above GDCS pool 84 via a vent pipe 94. A wall 96 extends between wetwell 76 and drywell 74, and an opening, or spill-over-hole, 98 extends therethrough. A spill-over line 100 extends from suppression pool 88 through spill-over-hole 98. Wetwell 76 further includes a main vent 102 filled at least partially with water 104, and suppression pool of water 88 is higher than the main vent water 104 by a pressure differential $\Delta P_{DW/WW}$, which represents the pressure differential between drywell 74 and wetwell 76. Drywells, wetwells, GDCSes, spill-over-holes, and vent lines are well known.

PCCS 80 includes a set of passive containment cooling condensers (not shown in FIG. 2) positioned in a pool of water, or IC/PCC pool, 106, which is located outside drywell 74. A steam inlet path (not shown in FIG. 2) extends between drywell 74 and the passive containment cooling condensers.

and is configured to transport steam from within drywell to such condensers. The passive containment cooling condensers are configured to condense steam received from drywell 74 and remove heat generated within drywell 74. Particularly, the passive containment cooling condensers discharge the condensed steam, or condensate, into drywell 72 and discharge noncondensables into suppression pool 88. Passive cooling containment systems are well known.

Vacuum breaker assembly 72 includes a vacuum breaker 108, which couples wetwell 76 to drywell 74, and a vacuum breaker condensing system 110. Vacuum breaker 108 may be a known vacuum breaker, and is configured to move between an open position, where fluid and steam flow through vacuum breaker 108 between wetwell 76 and drywell 74, and a closed position, where vacuum breaker 108 substantially prevents fluid and steam from flowing between wetwell 76 and drywell 74. Condensing system 110 is coupled to vacuum breaker 108 and includes a condenser 112 and a steam inlet pipe 114. Steam inlet pipe 114 is substantially hollow and includes a first end 116 and a second end 118. First end 116 of steam inlet pipe 114 is positioned in drywell 74 and second end 118 of steam inlet pipe 114 is coupled to vacuum breaker 108. Between first and second ends 116 and 118, respectively, steam inlet pipe 114 further includes a loop seal 120 having a height H. Steam inlet pipe first end 116 is spaced above spill-over-hole 98 with respect to a floor 122 of drywell 74.

Condenser 112 is positioned in drywell 74 proximate steam inlet pipe 114 and is configured to substantially condense steam flowing through steam inlet pipe 114. Condenser 112 includes an inlet, or cold leg, 124, an outlet, or hot leg, 126, and a plurality of condenser tubes 128. Condenser inlet 124 and condenser outlet 126 each extend between IC/PCC pool 106 and drywell 74, and are configured to draw water from IC/PCC pool 106 and through condenser tubes 128.

During reactor operation, vacuum breaker 108 typically moves to the open position to reduce the pressure differential between wetwell 76 and drywell 74. Particularly, if pressure in wetwell 76 becomes sufficiently great compared to pressure in drywell 74, vacuum breaker 108 opens and noncondensables and steam in wetwell 76 flow through vacuum breaker 108 and into drywell 74 to reduce the differential pressure.

Vacuum breaker condensing system 72 substantially prevents steam from flowing from drywell 74 and into wetwell 76 while vacuum breaker 108 is in the open position. If vacuum breaker 108 becomes stuck in the open position for too long, it is possible for the differential pressure between the wetwell 76 and the drywell 74 to reduce so that steam in drywell 74 begins flowing from drywell 74 and through steam inlet pipe 114 toward vacuum breaker 108 and wetwell 76. Condenser inlet 124 supplies cold water from IC/PCC pool 106 to condenser 112, which circulates such water through condenser tubes 128 to substantially condense any steam flowing through pipe 114. The heated water flowing through condenser tubes 128 is discharged from condensing system 72 via condenser outlet 126 and into IC/PCC pool 106.

Condensed steam, or condensate, 130 accumulates in loop seal 120 and forms a static head column HC of approximately $\Delta P_{DW/WW}$. Static head column HC substantially seals steam inlet pipe 114 and substantially prevents additional steam and noncondensables from flowing from drywell 74 toward vacuum breaker 108 through steam inlet pipe 114.

The above described condensing systems substantially prevent steam and noncondensables from flowing from the drywell and into the wetwell while the vacuum breaker is in the open position. Such systems also facilitate maintaining an acceptable drywell to wetwell pressure differential.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. For example, the above described condensing system was coupled to either the GDCS pool or the IC/PCC pool. However, such condensing system may be coupled to a pool of water, or coolant, other than the GDCS pool or the IC/PCC pool. Accordingly, the spirit and scope of the invention are to be limited only by the terms of the appended claims.

I claim:

1. A condensing system for a vacuum breaker of a nuclear reactor, said system configured to couple to the vacuum breaker, said system comprising:

a steam inlet pipe, said steam inlet pipe comprising a loop seal between a first end and a second end; and a condenser, said condenser positioned proximate said steam inlet pipe and configured to substantially condense steam flowing through said steam inlet pipe.

2. A condensing system in accordance with claim 1 wherein the nuclear reactor includes a wetwell, and wherein said condenser is positioned in the wetwell.

3. A condensing system in accordance with claim 1 wherein the nuclear reactor includes a drywell, and wherein said condenser is positioned in the drywell.

4. A condensing system in accordance with claim 1 wherein the reactor includes a pool of water, and wherein said condenser is coupled to the pool of water.

5. A nuclear reactor comprising:

a wetwell;

a drywell;

a vacuum breaker coupling said wetwell to said drywell; and a condensing system coupled to said vacuum breaker, said condensing system comprising:

a steam inlet pipe; and a condenser, said steam inlet pipe coupled to said vacuum breaker, said condenser positioned proximate said steam inlet pipe and configured to substantially condense steam flowing through said steam inlet pipe.

6. A nuclear reactor in accordance with claim 5 wherein said condenser is positioned in said wetwell.

7. A nuclear reactor in accordance with claim 5 wherein said condenser is positioned in said drywell.

8. A nuclear reactor in accordance with claim 5 further comprising a pool of water, wherein said condenser is coupled to said pool of water.

9. A nuclear reactor in accordance with claim 8 wherein said pool of water comprises a Gravity Driven Cooling System pool.

10. A nuclear reactor in accordance with claim 8 wherein said pool of water comprises a passive cooling containment system pool.

11. A nuclear reactor in accordance with claim 5 wherein said steam inlet pipe comprises a first end, a second end, and a loop seal between said first end and said second end, said second end coupled to said vacuum breaker, said first end positioned in said drywell.

12. A nuclear reactor in accordance with claim 5 further comprising a wall separating said wetwell from said drywell, said wall having a spill-over-hole therein, said spill-over-hole spaced from a floor of said drywell, said steam inlet pipe first end positioned above said spill-over-hole.

13. A method for preventing steam from flowing from a drywell to a wetwell in a nuclear reactor utilizing a condensing system, the nuclear reactor including a vacuum breaker and a pool of water, the vacuum breaker coupling the drywell to the wetwell, the condensing system including a steam inlet pipe and a condenser, said method comprising the steps of:

coupling the steam inlet pipe to the vacuum breaker;

positioning the condenser proximate the steam inlet pipe; and coupling the condenser to the pool of water.

14. A method in accordance with claim 13 wherein the steam inlet pipe includes a first end, a second end, and a loop seal between the first end and the second end, and wherein coupling the steam inlet pipe to the vacuum breaker comprises the step of coupling the second end of the steam inlet pipe to the vacuum breaker so that the first end is positioned adjacent the drywell.

15. A method in accordance with claim 13 further comprising the step of positioning the condenser in the drywell.

16. A method in accordance with claim 13 further comprising the step of positioning the condenser in the wetwell.

* * * * *